United States Patent [19]

Banner

[11] Patent Number: 4,758,341

[45] Date of Patent: Jul. 19, 1988

[54] MEMBRANE SEPARATION DEVICE

[75] Inventor: Janet L. Banner, San Ramon, Calif.

[73] Assignee: The Dow Chemical Company, Midland, Mich.

[21] Appl. No.: 40,413

[22] Filed: Apr. 20, 1987

[51] Int. Cl.[4] .............................................. B01D 13/00
[52] U.S. Cl. ...................................... 210/232; 55/158; 210/321.9; 210/350
[58] Field of Search ............... 210/321.1, 321.2, 321.3, 210/433.2, 500.23, 232, 350, 321.9; 55/16, 158

[56] References Cited

U.S. PATENT DOCUMENTS

| | | | |
|---|---|---|---|
| 3,339,341 | 9/1967 | Maxwell et al. | 55/16 |
| 3,442,002 | 5/1969 | Geary et al. | 29/450 |
| 3,616,928 | 11/1971 | Rosenblatt | 210/321 |
| 3,832,830 | 9/1974 | Gerow | 55/158 |
| 4,061,574 | 12/1977 | Clark | 210/321 |
| 4,080,296 | 3/1978 | Clark | 210/321 |
| 4,308,654 | 1/1982 | Bogart | 29/451 |
| 4,421,529 | 12/1983 | Revak et al. | 55/16 |
| 4,517,720 | 5/1985 | Otstot et al. | 29/157 |
| 4,666,469 | 5/1987 | Krueger et al. | 55/16 |

Primary Examiner—Frank Spear

[57] ABSTRACT

This invention relates to an improved hollow fiber membrane device in which an adjustable, gas permeable, non-elastic outerwrap applies a compressive force to the bundle in a direction perpendicular to the bundle's longitudinal axis only during operation of the device. During storage or non-use of the membrane device, the outerwrap applies minimal compressive force to the bundle.

16 Claims, 2 Drawing Sheets

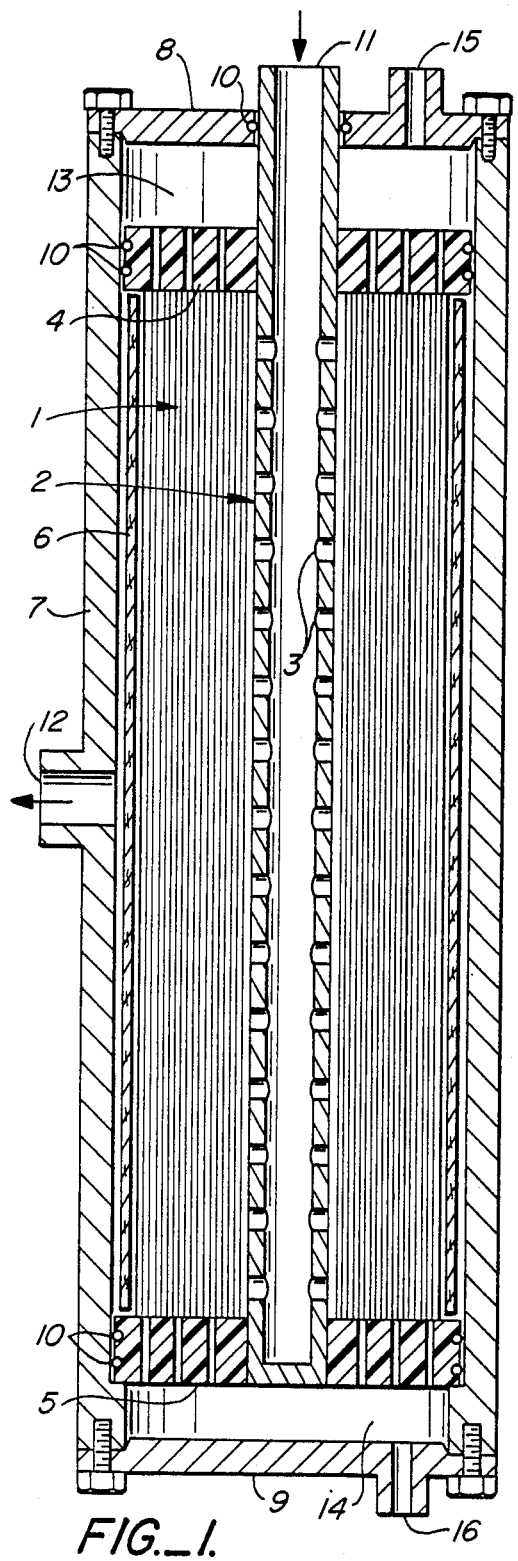
FIG._1.
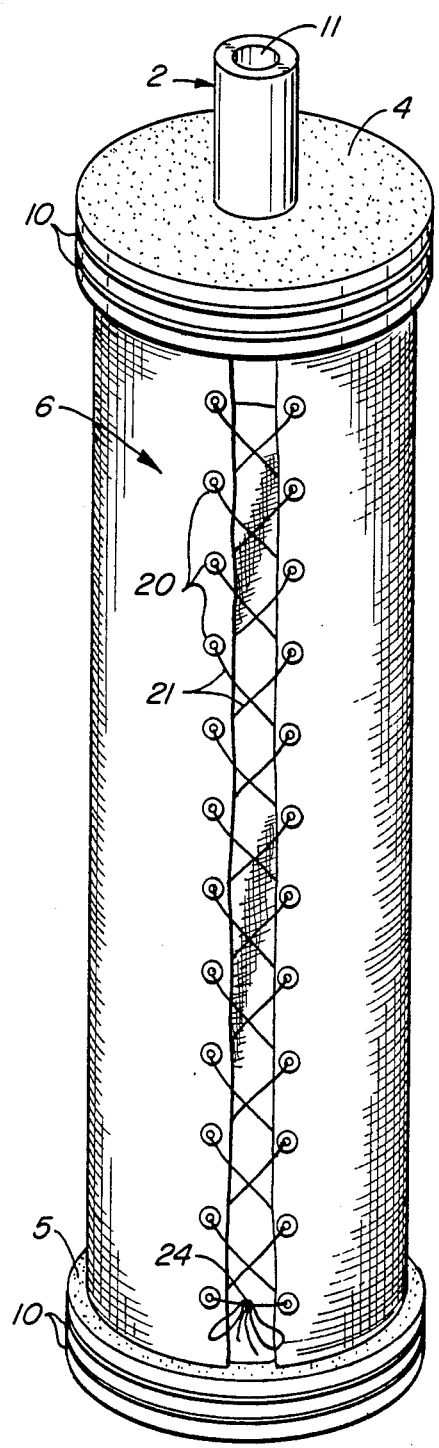
FIG._2.

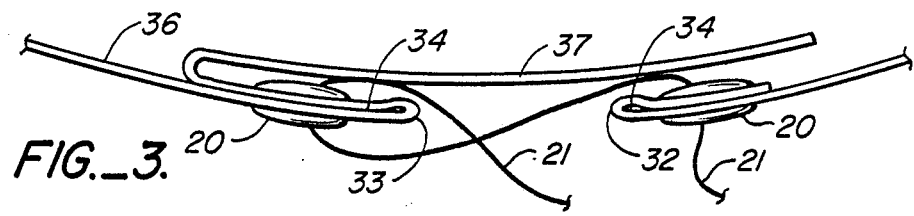
FIG._3.
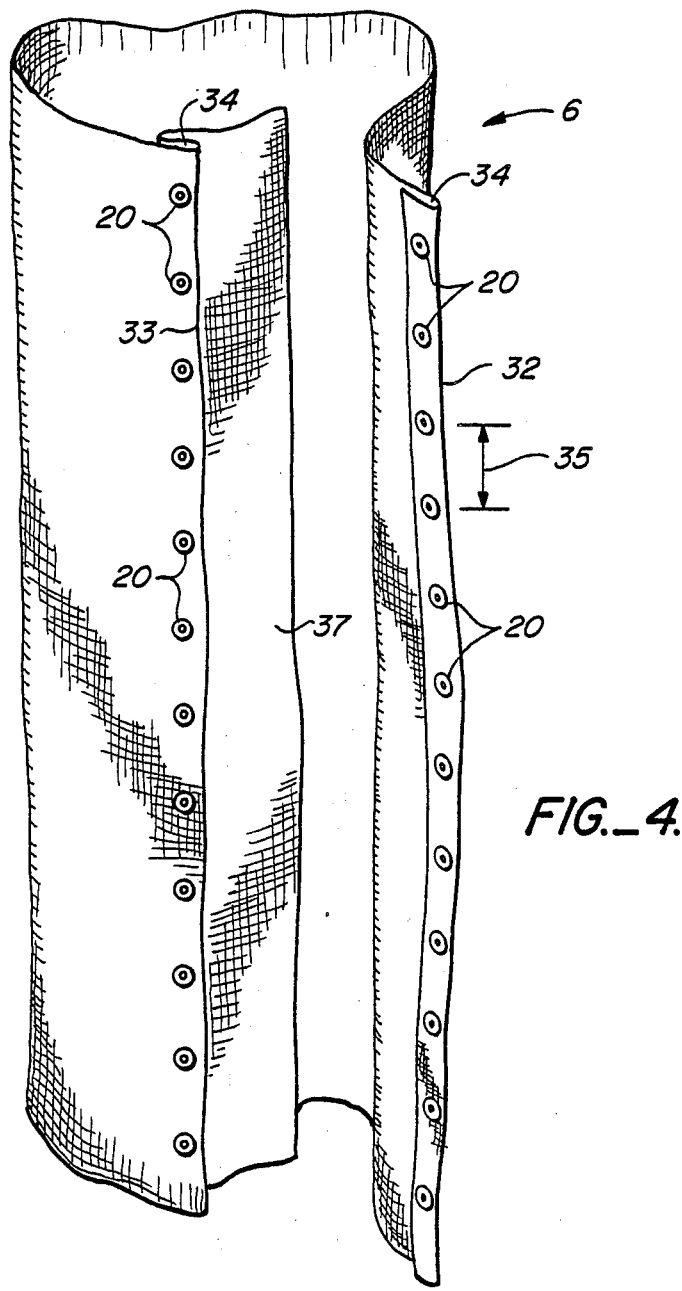
FIG._4.

MEMBRANE SEPARATION DEVICE

BACKGROUND OF THE INVENTION

This invention relates to an improved hollow fiber membrane device in which an adjustable, gas permeable, low elastic outerwrap applies a compressive force to the bundle in a direction perpendicular to the bundle's longitudinal axis only during operation of the device.

Membrane devices are used to selectively separate at least one fluid component from a mixture of fluids. Membrane devices are used in a wide variety of separation applications including reverse osmosis and gas separation. Particular gas separations of interest include the recovery of an enriched oxygen stream from air for use in enhanced combustion processes. Alternately, an enriched nitrogen stream may be obtained from air for use as an inert atmosphere over flammable fluids or for food storage. In other embodiments, nitrogen, helium, or carbon dioxide may be separated from hydrocarbons.

Different membrane device configurations suitable for gas separation are described in the art, including plate and frame, tubular, spiral wound, and hollow fiber configurations. The hollow fiber configuration is generally preferred because a higher surface area per unit volume of device can be obtained, resulting in increased device productivity compared to other configurations.

Hollow fiber membrane devices are typically fabricated by parallel or bias wrapping a plurality of hollow fibers about a core. The hollow fibers are embedded in at least one tubesheet and the assembly is inserted into a case. The tubesheet(s) sealingly engages along the inside surface of the case so that two fluid regions are defined, commonly referred to as the shellside and the tubeside regions. The shellside region lies on the outside of the hollow fibers and is defined by the inside wall of the case and the tubesheets which sealingly engage along the inside of wall the case. The tubeside region lies on the inside of the hollow fibers. Communication between the two regions is accomplished by selective permeation of a component(s) through the membrane.

To separate a gas mixture into two portions, one richer and one leaner in at least one component, the mixture is brought into contact with one side of a semi-permeable membrane through which at least one of the gaseous components selectively permeates. A gaseous component which selectively permeates through the membrane passes through the membrane more rapidly than the other component(s) of the mixture. The gas mixture is thereby separated into a stream which is enriched in the selectively permeating component(s) and a stream which is depleted in the selectively permeating component(s). The stream which is depleted in the selectively permeating component(s) is enriched in the relatively nonpermeating component(s). A relatively nonpermeating component permeates more slowly through the membrane than the other component(s). An appropriate membrane material is chosen for the mixture at hand so that some degree of separation of the gas mixture can be achieved.

During operation, the fiber bundle has a tendency to expand when the membrane device is pressurized, resulting in a change in the bundle's packing factor. Packing factor refers to the density of packing of the hollow fibers within the bundle. The packing factor is defined by formula 1:

$$\frac{N D_o^2}{D_b^2} \quad \text{formula 1}$$

wherein
N is the total number of hollow fibers in the bundle,
$D_o$ is the outside diameter of the hollow fibers, and
$D_b$ is the diameter of the bundle.

Expansion of the fiber bundle during operation creates nonuniform flow distribution on the shellside of the membrane device which deleteriously affects separation performance. Furthermore, the fibers may be damaged during rapid pressure cycling unless restrained. A means of maintaining a uniform flow distribution during operation and pressure cycling is needed. By applying a uniform compressive force in a direction perpendicular to the longitudinal axis of the bundle, the packing factor for the bundle remains uniform throughout the bundle and uniform flow distribution can be achieved. Uniform compression along the fiber bundle may be accomplished through the use of an outerwrap.

Outerwraps used on membrane devices have been used in the past to protect the fiber bundle from damage during handling or to facilitate insertion of the fiber bundle into a case. Such outerwraps have generally been fabricated from a highly elastomeric material. While highly elastomeric outerwraps apply the necessary uniform compressive force to the fiber bundle, the bundle is under compression at all times. This generally results in loss of performance in devices in which the feed is introduced on the shell side; such performance losses are related to flow distribution problems and compression of the fibers during non-use of the device, among other causes. One such performance loss is a decline in non-permeate flow from the initial performance value due to the compressive force exerted on the bundle during non-use. An outerwrap which applies a uniform compressive force along the fiber bundle only during operation and minimal or no compression during non-use is needed.

SUMMARY OF THE INVENTION

The invention relates to an improved hollow fiber membrane device comprising a plurality of hollow fiber membranes assembled into a bundle and embedded in at least one tubesheet, the improvement comprising an adjustable, gas permeable, low elastic outerwrap which applies a uniform compressive force to the bundle in a direction perpendicular to the bundle's longitudinal axis during operation of the device and minimal compressive force during non-use.

BRIEF DESCRIPTION OF THE FIGURES

FIG. 1 relates to a cross-section of a hollow fiber membrane bundle inserted into a case. FIG. 2 relates to a hollow fiber membrane bundle surrounded by the outerwrap. FIGS. 3 and 4 relate to the outerwrap which is the subject of the invention.

DETAILED DESCRIPTION OF THE INVENTION

The use of hollow fiber membrane devices for the separation of a fluid from a mixture of fluids is well known in the art. The feed fluid may be a liquid, such as in reverse osmosis, or a gas. The separation of gaseous mixtures is a preferred use of the improved membrane device which is the subject of the invention.

Hollow fiber membrane devices are typically fabricated by assembling a plurality of hollow fibers membranes into a bundle. In one preferred embodiment, the hollow fibers are wrapped in parallel about a core. In another preferred embodiment, the hollow fibers may be bias wrapped about a core. The core is generally perforated to provide a fluid distribution means through which the feed fluid may be introduced into the bundle and uniformly distributed radially through the bundle. The ends of the hollow fibers are embedded in at least one tubesheet. The tubesheet(s) are typically made from a thermoplastic or thermoset material such as an epoxy resin. The hollow fiber bundle is inserted into a case for operation. The tubesheet(s) sealingly engages along the inside surface of the case so that two fluid regions are defined, with communication between the two regions accomplished by selective permeation of a component(s) through the membrane. One skilled in the art would recognize that additional forms of the hollow fiber membrane device are operable. A number of such membrane devices may optionally be operated in parallel or series in order to increase capacity and/or improve separation performance. Various hollow fiber membrane devices are described in U.S. Pat. Nos. 3,228,876; 3,339,341; 3,455,460; 3,475,331; 3,526,011; 3,528,553; 3,690,465; 3,616,928; 3,832,830; 4,045,851; 4,061,574; 4,080,296; 4,220,535; 4,265,763; 4,271,900; 4,315,819; 4,336,138; 4,367,139; the relevant portions of these patents are incorporated herein by reference.

The outerwrap for the hollow fiber membrane device is made from a gas permeable, low elastomeric fabric. The fabric may be woven from any synthetic or natural textile fiber, provided the fabric possesses sufficient elastic modulus, gas permeability, tensile strength, temperature resistance, and chemical resistance under conditions of use in the membrane device. Examples of preferred fabrics include those primarily containing polyester, polyamide, cotton, cellulosic, polypropylene fibers, or blends thereof.

The woven fabric must be permeable to gases. The air flow rate through the fabric is preferably between about 25 to about 50 cubic feet/minute (about 0.7 to about 1.4 cubic meters/minute), more preferably of between about 35 to about 40 cubic feet/minute (about 1.0 to about 1.1 cubic meters/minute). The air flow rate through the fabric is measured by ASTM D 737 using the specified Frazier Precision test apparatus.

The fabric must have an elastic modulus sufficient to maintain the fiber bundle at a uniform packing factor during operation and yet apply minimal compressive force during non-use. As used herein, low elastic refers to a fabric which exerts no or minimal compression on a fiber bundle when wrapped about the fiber bundle. Non-use as used herein refers to periods when the hollow fiber membrane device is not used to separate gases. The fabric preferably has an elastic modulus of about 300 to about 3000 pound force-inch/inch per inch of width (about 526 to about 5256 Newton-centimeter/centimeter per centimeter of width), more preferably of about 600 to about 1500 pound force-inch/inch per inch of width (about 1051 to about 2628 Newton-centimeter/centimeter per centimeter of width). The outerwrap preferably maintains the bundle at a uniform packing factor of from about 0.35 to about 0.75, more preferably from about 0.45 to about 0.70.

It is preferable that the fabric behave elastically, it is preferably not in the plastic region where it would become permanently deformed: i.e., upon removal of the load the fabric contracts to its orginal length. Furthermore, the fabric preferably does not creep significantly under load. Creep refers to the increasing strain which occurs when an object is subjected to a constant applied stress over time. When a fabric sample 4 inches in width by 3 inches in length (10.2 centimeters in width by 7.6 centimeters in length) is placed in an Instron with 1 inch (2.54 centimeter) grips under a 60 pound force (267 Newton) constant load for 24 hours, the measured creep is preferably less than about 5 percent, more preferably less than about 1 percent.

The outerwrap may be fabricated in a number of configurations capable of fastening about the hollow fiber bundle, so long as the outerwrap provides a substantially uniform compressive force along the entire bundle in a direction perpendicular to the longitudinal axis of the fiber bundle, while being capable of adjusting to to fit varying bundle diameters. FIG. 2 illustrates a preferred embodiment of the outerwrap surrounding the hollow fiber bundle. The outerwrap (6) is fastened about the hollow fiber bundle by means of grommets (20) and lacing (21). The outerwrap configuration is adjustable so that a single outerwrap is capable of accomodating different fiber bundle diameters. In a preferred embodiment, the outerwrap is fabricated from a single piece of fabric. The length and width of the piece of fabric used will depend upon the size of the fiber bundle. The length of the piece of fabric should be sufficient to span substantially the length of the fiber bundle from tubesheet (4) to tubesheet (5). The circumference of the outerwrap must be sufficient to enclose the fiber bundle.

The invention can be better understood through reference to FIGS. 3 and 4. The outerwrap is fastened about the hollow fiber bundle by means of a grommet (20) and lacing (21) arrangement. Alternate fastening means are operable so long as comparable strength and adjustability are obtained. The grommets (20) are affixed to the longitudinal edges (32) and (33) of the outerwrap which have been optionally overlapped and reinforced by methods commonly used in the art, such as the use of webbing or adhesive in the enclosed space (34). The optimal spacing (35) between the grommets (20) is determined by the number of points required to distribute the load under conditions of use, the degree of circumferential adjustment capability required from tubesheet to tubesheet, the capability of the fabric to lay flat against the bundle surface, and the size of the grommets. Such spacing may be readily determined by empirical methods by one skilled in the art. The tongue (37) is a portion of fabric used to protect the hollow fibers from damage by the grommets.

The ultimate tensile strength of the fabric should be sufficiently high so that the grommets are not torn out of the outerwrap under the conditions of use. The fabric preferably has an ultimate tensile strength of at least about 170 pound force per inch of width (298 Newton per centimeter of width) as measured by ASTM D 1682. The grommets preferably can withstand a circumferential load of at least about 50 pound force (223 Newton), more preferably at least about 75 pound force (334 Newton), without tearing out of position. The lacing preferably has a minimum actual tension strength of at least about 95 pound force (423 Newton). An example of preferred lacing includes nominally rated 130 pound force (579) braided Dacron* polyester fishing line available from Cortland.

The outerwrap is positioned about the fiber bundle so that it lays substantially flat across the bundle surface. The outerwrap is adjusted by the fastening means to preferably provide a circumferential tension around the bundle during storage or non-use of between about 0.25 to about 3.0 pound force (1.1 to 13.4 Newtons), more preferably between about 0.25 to about 1.0 pound force (1.1 to 4.5 Newtons). The outerwrap provides a uniform compressive force in a direction perpendicular to the longitudinal direction of the fiber bundle during operation by maintaining a uniform bundle packing factor. Preferably the packing factor during operation is maintained at between about 0.35 to 0.75, more preferably between about 0.45 to about 0.70.

The hollow fiber membranes used in the device which is the subject of the invention may be fabricated from a variety of polymers. The polymer of choice will depend upon the membrane application. Permeability, separation factor, chemical resistance, temperature resistance, mechanical strength, and extrudability are some of the factors which determine the optimum polymer for a given application. Such polymers useful for membranes are well known and are described in the literature. See *The Polymer Handbook*. J. Brandrup and E. H. Immergut, John Wiley and Sons, 1975, incorporated herein by reference. Examples of preferred membrane materials include polycarbonates, cellulose esters, cellulose ethers, polysulfones, polyethersulfones, polyolefins, polyphenylene oxides, perfluorosulfonic acid polymers, polyamides, and the like. Especially preferred are hollow fiber membranes fabricated from cellulose triacetate, polysulfone, polyethersulfone, subtituted poly(bisphenol-A-carbonate), and poly-4-methyl-pentene-1. Substituted poly(bisphenol-A-carbonate) refers to a poly(bisphenol-A-carbonate) in which substituent groups partially or fully replace hydrogen on the phenol rings. Preferred subtituents include halo groups such as bromo and chloro; $C_6$ alkyl and $C_6$ haloalkyl groups such as methyl, bromomethyl, bromochloromethyl, and the like; cyano groups; and nitro groups. Preferably, the phenolic rings are substituted in the 3 and 5 positions.

Hollow fiber membranes used in the present invention may be homogeneous, asymmetric, or composite. Membrane extrusions processes are well known in the art. Generally hollow fiber membranes which are homogeneous are prepared by extruding a polymer through a heated spinnerette to produce a melt. An inert gas is pumped through the center of the fiber as it is spun to prevent it from collapsing as the fiber cools. The fiber is drawn down to the desired size prior to solidification by use of rollers.

The formation of asymmetric membranes results from extrusion of a polymer solution, optionally quenching the extruded fiber in a fluid, and subsequently leaching out the solvent. U.S. Pat. No. 4,127,625, incorporated herein by reference, describes a method for producing asymmetric membranes from cellulose acetate.

The size of the hollow fiber membranes used in the invention is not critical. Fiber sizes which are useful are known to those skilled in the art. Typically hollow fibers range in outside diameter from about 20 microns to about 800 microns, more typically from about 40 microns to about 300 microns. The thickness of the fiber walls ranges from about fivemicrons to about 250 microns, more typically from about 10 microns to about 150 microns.

FIG. 1 illustrates a cross-sectional view of a hollow fiber membrane device depicting a preferred embodiment of the invention. The hollow fiber bundle (1) consists of hollow fiber membranes which are arranged substantially in parallel about a core (2) containing a number of perforations (3). The core (2) passes through a first tubesheet (4) and terminates in a second tubesheet (5). The ends of the hollow fibers are embedded in the tubesheets (4) and (5). An outerwrap (6) surrounds the hollow fiber bundle. The hollow fiber bundle (1) is inserted into a pressure case (7) having endplates (8) and (9) for operation. The tubesheets (4) and (5) sealingly engage along the inside surface of the case (7) by means of O-rings (10) so that two fluid regions are defined, with communication between the two regions accomplished by selective permeation of a component(s) through the membrane.

The feed fluid is introduced into the inlet (11) of the core (2). The feed fluid passes down the core (2) through the perforations (3) and is distributed radially along the outside of the hollow fiber bundle (1). The non-permeate stream is removed from the case at the outlet (12). The remainder of the feed fluid permeates through the hollow fiber membranes and passes down the bores of the hollow fibers to the header spaces (13) and (14). The permeate which is collected in header spaces (13) and (14) is removed through outlets (15) and (16) in the case (7). One skilled in the art would recognize that alternate flow variations of the hollow fiber device are operable.

The operable pressure differential across the membrane depends on a number of factors, including the membrane material, the gases to be separated, and the wall thickness of the membrane. The pressure differential across the membrane must be sufficiently high so that permeation through the membrane occurs at a reasonable rate but must be low enough so that the fiber is not damaged. In the embodiment where oxygen is separated from nitrogen with membranes fabricated from poly-4-methylpentene-1, the pressure differential is preferably at least about 10 psig (68.95 kPa) and preferably is less than about 150 psig (1034.2 kPa). In the embodiment in which carbon dioxide is separated from methane using cellulose acetate membranes, the pressure differential across the membrane is preferably at least about 10 psig (68.95 kPa) and preferably is less than about 800 psig (5515.8 kPa).

The separation process should be carried out at temperatures sufficiently high so that the feed gas does not contain a substantial quantity of condensed gases which may deleteriously affect the membrane. The separation process should be carried out at temperatures sufficiently low so that membrane integrity, lifetime, and performance are not adversely affected. The appropriate temperature range will depend upon the feed gas mixture to be separated and the membrane material. In the embodiment in which oxygen is separated from nitrogen with a poly-4-methyl-pentene-1 membrane, temperatures from about −10° C. to about 50° C. are preferred. In the embodiment in which carbon dioxide is separated from methane with cellulose triacetate membranes, temperatures of from about −10° C. to about 40° C. are preferred.

The present invention applies a uniform compressive force in a direction perpendicular to the longitudinal axis of the fiber bundle, thus achieving uniform flow distribution on the shellside. Previous outerwraps have caused storage loss, which is a decline in non-permeate flow from the initial performance value due to the compressive force exerted on the bundle at all times. The present invention significantly reduces or eliminates performance loss by applying a uniform compressive force along the fiber bundle only during operation and minimal or no compression during non-use.

SPECIFIC EMBODIMENTS

The following comparative examples are presented to illustrate the invention only and are not intended to limit the scope of the invention of claims.

EXAMPLE 1

A hollow fiber membrane device with a bundle diameter of about 9 inches (22.9 centimeters) and an exposed fiber length between tubesheets of about 36 inches (91.4 centimeters) fabricated. The membrane device contains about $14.7 \times 10^6$ hollow fiber membranes with a surface area of 16,000 square feet. The fibers are melt spun from 4-methyl-pentene-1 in the manner described in U.S. Pat. No. 4,421,529, incorporated herein by reference. The fibers are arranged substantially in parallel about a perforated core and are affixed in place using an epoxy resin containing an aliphatic curing agent. After the tubesheets are cured, the fibers bores are opened by cutting away the face of the tubesheets.

An outerwrap similar to that depicted in FIGS. 3 and 4 is placed around the fiber bundle under various circumferential tensions. The outerwrap is comprised of a 100% polyester fabric obtained from Westpoint-Pepperell and designated style No. 42-1880. The fabric has an air flow rate of about 25 to 35 cubic feet/minute (0.7 to 1.0 cubic meters/minute) as measured by ASTM D 737. The elastic modulus of the fabric is about 1000 pound force-inch/inch per inch of width (1752 Newton-centimeter/centimeter per centimeter of width) and the ultimate tensile strength is about 615 pound force per inch of width (1076 Newton per centimeter of width) as measured by ASTM D 1682.

The bundle is inserted into a pressure case and feed air at about 90 psig (620.5 kPa) and about 25° C. is introduced into the module via the core. The non-permeate (nitrogen) flows are measured as a function of outerwrap circumferential tension about the bundle. An outerwrap circumferential tension of between 1.5 to 2.0 pounds force appears to result in maximum non-permeate flow.

TABLE I

| Outerwrap Tension (pound force) | Non-permeate Flow (SCFM) |
| --- | --- |
| 1.0 | 5.9 |
| 1.5 | 6.3 |
| 2.0 | 6.4 |

EXAMPLE 2

Three hollow fiber membrane devices are contructed in a manner similar to that described in Example 1 except that the outerwrap is comprised of a 50% polyester/50% cotton fabric. The fabric has an air flow rate of about 37 cubic feet/minute (1.1 cubic meters/minute) as measured by ASTM D 737. The elastic modulus of the fabric is about 300 pound force-inch/inch per inch of width (525 Newton-centimeter/centimeter per centimeter of width) and the ultimate tensile strength is about 78 pound force per inch of width (137 Newton per centimeter of width) as measured by ASTM D 1682. Each bundle is inserted into a pressure case and feed air at 90 psig (620.5 kPa) at 25° C. is introduced into the module via the core. The permeate and non-permeate flows are measured initially and then remeasured at two weeks intervals after storage of the device at about 30° C. Data are reported in Table II. Storage loss is less than about 10 percent.

TABLE II

| Module | Cumulative Storage Time (weeks) | Non-permeate Flow (SCFM) | Permeate Flow (SCFM) | Storage Loss (percent) |
| --- | --- | --- | --- | --- |
| A[1] | 0 | 6.4 | 15.4 | — |
|  | 2 | 5.9 | 14.8 | 8 |
|  | 6 | 6.3 | 15.0 | 2 |
| B[2] | 0 | 5.9 | 14.8 | — |
|  | 2 | 5.3 | 14.4 | 10 |
|  | 6 | 5.6 | 14.6 | 5 |
| C[3] | 0 | 6.2 | 14.9 | — |
|  | 2 | 6.2 | 14.8 | 0 |
|  | 6 | 6.2 | 15.0 | 0 |

[1] Outerwrap circumferential tension 1.0 pound force
[2] Outerwrap circumferential tension 1.5 pound force
[3] Outerwrap circumferential tension 2.0 pound force Each module has a different beginning performance due to variabilities in the manufacturing process, therefore, the baseline performance is that performance obtained before any storage occurs. The variability in the data is also related to the precision of the tests. The precision for non-permeate flow is + or −0.3, and for permeatae flow is + or −0.5.

EXAMPLE 3

This example does not illustrate the present invention but is meant to indicate the state of the prior art.

Three hollow fiber membrane devices are constructed in a manner similar to that described in Example 1, except that in place of the nonelastomeric outerwrap, three tubular elastic surgical bandages of viscose rayon obtained from Seton Company are used. The elastic bandages each have a nominal relaxed circumference of about 9.75 inches (24.8 centimeters). Each bundle is inserted into a pressure case and feed air at about 90 psig (620.5 kPa) and about 25° C. is introduced into the module via the core. The permeate and non-permeate flows are measured. The device is then stored for 2 week intervals at about 30° C. and the permeate and non-permeate flows remeasured. Data are shown in Table III. A substantial decrease in nonpermeate flow with storage time is observed, resulting in storage losses of 15 to 29 percent. This storage loss is significantly higher than 0 to 10 percent observed with the present invention in Example 2.

TABLE III

| Module | Cumulative Storage Time (weeks) | Non-permeate Flow (SCFM) | Permeate Flow (SCFM) | Cumulative Storage Loss (percent) |
| --- | --- | --- | --- | --- |
| A | 0 | 5.7 | 14.4 | — |
|  | 2 | 4.6 | 14.2 | 19 |
|  | 6 | 4.5 | 14.2 | 21 |
| B | 0 | 5.9 | 14.8 | — |
|  | 2 | 5.0 | 14.3 | 15 |
|  | 6 | 4.9 | 14.5 | 17 |
| C | 0 | 6.2 | 14.7 | — |
|  | 2 | 4.4 | 13.9 | 29 |
|  | 6 | 4.6 | 14.3 | 26 |

What is claimed is:

1. An outerwrap useful in a hollow fiber membrane device comprising
   a. a gas permeable, low elastic fabric which substantially spans the active fiber length and surrounds the fiber bundle, wherein the low elastic fabric applies a uniform compressive force to the bundle in a direction perpendicular to the bundle's longitudinal axis during operation of the device and exerts no or minimal compressive force on the fiber bundle during storage or non-use;
   b. a means of securing the outerwrap about the fiber bundle which possesses sufficient strength under conditions of use; and
   c. a means of adjusting the circumferential fit of the outerwrap about the fiber bundle to accommodate variations in the fiber bundle diameter which occur along the length of the fiber bundle, wherein the means of adjusting the outerwrap about the fiber bundle may optionally be the same as the means of securing the outerwrap about the fiber bundle.

2. The outerwrap of claim 1 wherein the outerwrap provides a circumferential tension about the bundle during storage or non-use of between about 0.25 to about 3.0 pound force.

3. The outerwrap of claim 2 wherein the fabric comprising the outerwrap possesses an air flow rate through the fabric of between about 25 to about 50 cubic feet/minute.

4. The outerwrap of claim 3 wherein the fabric comprising the outerwrap possesses an elastic modulus of about 300 to about 1500 pound force-inch/inch per inch of width.

5. The outerwrap of claim 4 wherein the fabric comprising the outerwrap possesses an ultimate tensile strength of at least about 170 pound force per inch of width.

6. The outerwrap of claim 5 wherein the fabric is primarily comprised of polyester, polyamide, cotton, cellulosic, polypropylene fibers or blends thereof.

7. The outerwrap of claim 1 wherein the securing and adjusting means comprise a grommet and lacing arrangement.

8. An improved hollow fiber membrane device comprising
   a. a plurality of hollow fiber membranes assembled into a bundle and embedded in at least one tubesheet:
   b. an outerwrap comprising
      i. a gas permeable, low elastic fabric which substantially spans the active fiber length and surrounds the fiber bundle,
      ii. a means of securing the outerwrap about the fiber bundle which possesses sufficient strength under conditions of use, and
      iii. a means of adjusting the circumferential fit of the outerwrap about the fiber bundle to accomodate variations in the fiber bundle diameter which occur along the length of the fiber bundle, wherein the means for adjusting the outerwrap about the fiber bundle may optionally be the same element as the means for securing the outerwrap about the bundle;
   wherein the outerwrap applies a uniform compressive force to the bundle in a direction perpendicular to the bundle's longitudinal axis during operation of the device and no or minimal compressive force during storage or non-use.

9. The hollow fiber membrane device of claim 8 wherein the outerwrap provides a circumferential tension about the bundle during storage or nonuse of between about 0.25 to about 3.0 pound force.

10. The hollow fiber membrane device of claim 9 wherein the fabric comprising the outerwrap possesses an air flow rate through the fabric of between about 25 to about 50 cubic feet/minute.

11. The hollow fiber membrane device of claim 10 wherein the fabric comprising the outerwrap possesses an elastic modulus of about 300 to about 1500 pound force-inch/inch per inch of width.

12. The hollow fiber membrane device of claim 11 wherein the fabric comprising the outerwrap possesses an ultimate tensile strength of at least about 170 pound force per inch of width.

13. The hollow fiber membrane device of claim 12 wherein the hollow fiber membranes are comprised of poly-4-methylpentene-1, cellulose triacetate, subtituted poly(bisphenol-A-carbonate), polysulfone, or polyethersulfone.

14. The hollow fiber membrane device of claim 13 wherein the hollow fiber membrane is used to separate at least one of the gases selected from the group consisting of hydrogen, helium, oxygen, nitrogen, carbon dioxide, methane, and light hydrocarbons.

15. The hollow fiber membrane device of claim 12 wherein the outerwrap maintains the packing factor at between about 0.45 to about 0.70 during operation of the device.

16. The hollow fiber membrane device of claim 12 wherein the securing and adjusting means comprise a grommet and lacing arrangement.

* * * * *